US008028159B2

(12) United States Patent
Li

(10) Patent No.: US 8,028,159 B2
(45) Date of Patent: *Sep. 27, 2011

(54) SECURITY PROTOCOLS FOR HYBRID PEER-TO-PEER FILE SHARING NETWORKS

(75) Inventor: Jun Li, Eugene, OR (US)

(73) Assignee: The State of Oregon Acting by and through the State Board of Higher Education on Behalf of the University of Oregon, Eugene, OR (US)

(*) Notice: Subject to any disclaimer, the term of this patent is extended or adjusted under 35 U.S.C. 154(b) by 531 days.

This patent is subject to a terminal disclaimer.

(21) Appl. No.: 12/229,135

(22) Filed: Aug. 19, 2008

(65) Prior Publication Data

US 2009/0006853 A1 Jan. 1, 2009

Related U.S. Application Data

(63) Continuation of application No. 11/990,898, filed as application No. PCT/US2006/032951 on Aug. 22, 2006.

(60) Provisional application No. 60/710,669, filed on Aug. 22, 2005.

(51) Int. Cl.
*H04L 29/06* (2006.01)

(52) U.S. Cl. ...................................... 713/150

(58) Field of Classification Search ............ 713/150, 713/157, 168, 170, 177, 181, 176; 707/687, 707/690, 693, 697, 698, 699, 747; 709/217–219, 709/225, 226, 229; 726/9, 10, 20
See application file for complete search history.

(56) References Cited

U.S. PATENT DOCUMENTS

| | | | | |
|---|---|---|---|---|
| 5,903,651 A * | 5/1999 | Kocher | ......................... | 713/158 |
| 6,959,384 B1 * | 10/2005 | Serret-Avila | .................. | 713/176 |
| 7,620,606 B2 * | 11/2009 | Gentry et al. | ................... | 705/76 |
| 7,624,276 B2 * | 11/2009 | Princen et al. | ................ | 713/177 |
| 2001/0034839 A1 | 10/2001 | Karjoth et al. | | |
| 2002/0188605 A1 * | 12/2002 | Adya et al. | ......................... | 707/4 |
| 2003/0084003 A1 | 5/2003 | Pinkas et al. | | |
| 2004/0172476 A1 | 9/2004 | Chapweske | | |
| 2005/0065943 A1 * | 3/2005 | Miyata et al. | ................. | 707/100 |
| 2005/0091261 A1 * | 4/2005 | Wu et al. | ....................... | 707/102 |

* cited by examiner

*Primary Examiner* — Nirav B Patel
(74) *Attorney, Agent, or Firm* — Lumen Patent Firm

(57) ABSTRACT

In a hybrid peer-to-peer file sharing network including a receiver peer and a provider peer, the receiver sends the provider a ticket [710] obtained from a server authorizing the receiver to obtain a data object O. The receiver obtains a root value of a hash tree for the object, verifies its digital signature, and sends the provider peer a request for a block of data object O and a request for a corresponding set of hash values from the hash tree [714]. The receiver receives from the provider peer the block of O and the corresponding set of hash values of the hash tree [716] that do not contain any hash value in the local hash tree. The receiver sends the provider an acknowledgement of receipt [718], obtains a block key from the provider [720], decrypts the block, verifies the integrity of the block using the subset of hash values and the local hash tree for O, and updates the local hash tree by adding the subset of hash values to the local hash tree, as well as any newly calculated hash values [722]. The provider may submit to a server the acknowledgements as proof of its service to the receiver.

13 Claims, 6 Drawing Sheets

*Fig. 1A*
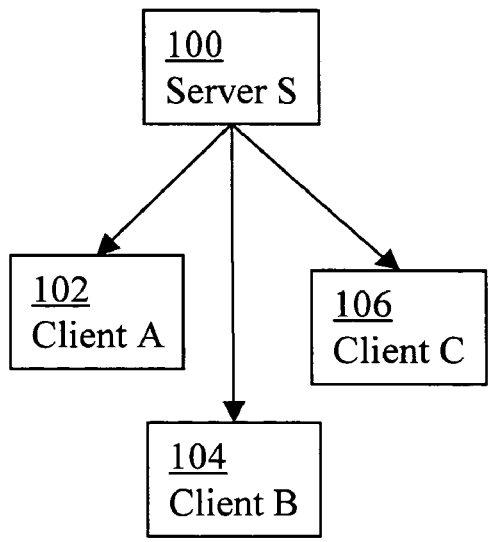
*Fig. 1B*
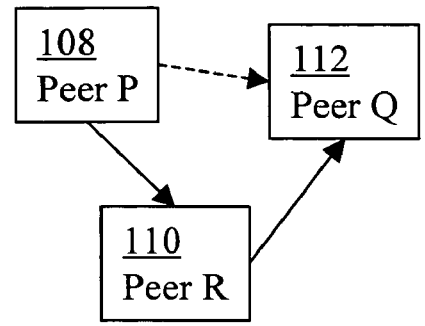
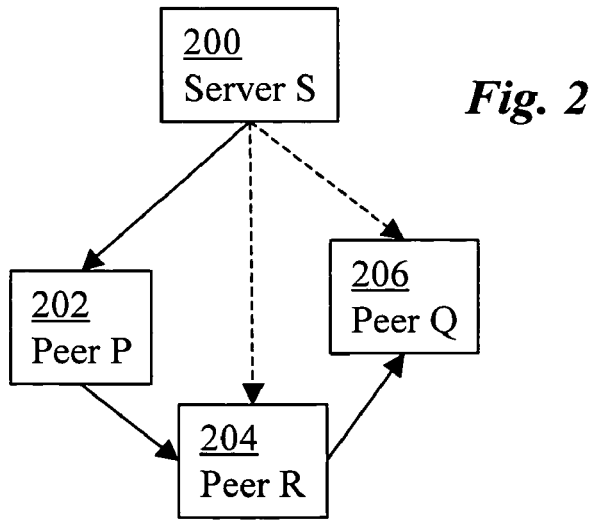
*Fig. 2*

SECURITY PROTOCOLS FOR HYBRID PEER-TO-PEER FILE SHARING NETWORKS

CROSS-REFERENCE TO RELATED APPLICATIONS

This application is a continuation of U.S. patent application Ser. No. 11/990,898 filed Jul. 31, 2008, which is a national stage filing of PCT Patent Application PCT/US2006/032951 filed Aug. 22, 2006, which claims priority from U.S. Provisional Patent Application 60/710,669 filed Aug. 22, 2005.

FIELD OF THE INVENTION

The present invention relates generally to hybrid peer-to-peer data sharing networks. More specifically, it relates to efficient security protocols for such networks.

BACKGROUND OF THE INVENTION

In a conventional client-server network, shown in FIG. 1A, a server 100 provides data to all clients 102, 104, 106. Security protocols such as secure sockets layer (SSL) are used to provide authentication and data confidentiality between client and server. When the number of clients increases, however, the bandwidth and storage demands on server 100 increases proportionately, which can result in reduced performance, especially when the server is providing clients with large digital media files. These problems with the client-server network paradigm have motivated the development of peer-to-peer networks. In a peer-to-peer network, shown in FIG. 1B, multiple peers 108, 110, 112 share data directly with each other instead of obtaining it from a server. For example, peer 108 can provide a file to peer 110 which in turn provides the file to peer 112. Alternatively, peer 112 could have obtained the same file from peer 108. As the number of peers increases, the bandwidth and storage capacity of the peer-to-peer network automatically increases as well. For these reasons, peer-to-peer file sharing networks have become popular ways of distributing large media files.

Most peer-to-peer networks are in fact hybrid peer-to-peer networks which combine features of pure peer-to-peer networks with features of conventional client-server networks. For example, as shown in FIG. 2, a peer-to-peer network may have a server 200 and clients 202, 204, 206 functioning as a conventional client-server network. At the same time, peers 202, 204, 206 function as a peer-to-peer network. Typically, the files are shared among peers while the server organizes and administers the peer-to-peer network, e.g., providing a directory of available files and peers that can share them. In some cases, the server may also provide files, e.g., if no peer is available to provide it. For example, server 200 may provide peer 202 with a file, which then may be shared with peer 204 which in turn shares it with peer 206. Alternatively, peers 204 or 206 could have obtained the file directly from server 200.

Unlike a client-server network, the data flow in a peer-to-peer network is not centralized at a trusted server that controls access to files and ensures their confidentiality and integrity. Consequently, peer-to-peer networks pose new security issues. For example, suppose peer 204 wants to obtain a file from peer 202. How does peer 202 know peer 204 is authorized to obtain it? How can data confidentiality between peers be supported? How can peer 204 be assured of the integrity of the file it obtains from peer 202? How can peer 202 prove that it delivered the file to peer 204? Such questions are important in hybrid peer-to-peer networks used to distribute software packages, sell large multimedia files, share critical information among participants, and many other applications. In addition, any practical solution to these peer-to-peer security issues should not require a large processing or bandwidth overhead.

The challenges of providing data integrity and proof-of-service in a peer-to-peer network are considerably larger than those for authentication and confidentiality. Moreover, ensuring data integrity in peer-to-peer networks is especially important since the integrity of data must be assumed for any proof-of-service to be meaningful.

The most obvious solution to providing data integrity in a peer-to-peer network is simply for the server to provide a digital signature of the file. Unfortunately, if the signature verification fails, the entire file must be retransmitted. When the file is very large, this consumes a large amount of bandwidth and time. To address this problem, the file object O may be divided into a sequence of N smaller data blocks $\{b(1), \ldots, b(N)\}$, and the server individually signs each block. This solution, however, introduces a large computational overhead since the client must decrypt the signature of every block in order to verify the integrity of the file.

Another technique can be used to reduce the computational demands of verifying individual blocks. Instead of signing every block, the server signs a single "superblock" $\{H(1), \ldots, H(N)\}$ that contains a strong one-way hash value $H(i)$ for every block $b(i)$ of the file. Before receiving any data blocks, the client obtains the superblock from the server and verifies its signature. Once it has the superblock, the client then verifies the integrity of each block it receives by computing a hash for the block and comparing it to the corresponding hash value in the superblock. Although this technique dramatically reduces the computational demands on the client, it can result in a long startup latency because the client must receive the entire superblock before receiving the first block of a file. The delay would not be acceptable to applications in which users prefer prompt response, such as multimedia streaming. Moreover, if the superblock itself is corrupted, the retransmission can also be costly. Increasing the block size can reduce the size of a superblock, but the retransmission cost of individual blocks will increase.

One known technique to address this start-up latency problem is based on the use of a Merkle hash tree. Given a data object O divided into $N=2^m$ blocks $\{b(1), \ldots, b(N)\}$, its binary Merkle hash tree, denoted $M(O)$, is a binary tree of $2^{m+1}-1$ hash values organized into $m+1$ levels. FIG. 3 shows an example Merkle hash tree for a data object with eight blocks. Level j of the tree consists of $2^j$ hash values, denoted $H(j,1), H(j,2), \ldots, H(j,2^j)$, where $H(j,i)$ is a hash of the consecutive pair of hash values $H(j+1,2i-1), H(j+1,2i)$ at level j+1. Level 0 of the tree (its "root") consists of a single hash value $H(0,1)$. Level m of the tree (its "leaves") simply consists of the $2^m$ hash values $\{H(1), \ldots, H(N)\}$ of the data blocks $\{b(1), \ldots, b(N)\}$. Thus, the hash values $H(m,1), H(m,2), \ldots, H(m,2^m)$ at level m are simply the hash values $\{H(1), \ldots, H(N)\}$.

The hash tree $M(O)$ of an object O is typically computed recursively by first computing hashes of the data blocks $\{b(1), \ldots, b(N)\}$, then computing hashes of these hashes, and so on, until the root value $H(0,1)$ is computed. For example, FIG. 3 shows hash values 314, 316, 318, 320, 322, 324, 326, 328 at level 3 derived directly from corresponding data blocks 330, 332, 334, 336, 338, 340, 342, 344. Hash values 306, 308, 310, 312 at level 2 are then derived by calculating hashes of pairs of consecutive hashes taken from the level 3 hash values. For example, hash value 306 is a hash of hash values 314 and 316.

Similarly, hash values 302 and 304 at level 1 are derived from hash values 306, 308, 310, 312 at level 2, and root hash value 300 at level 0 is derived from hash values 302 and 304 at level 1. An important property of the hash tree M(O) is that the root hash value H(0,1) depends on the data in all blocks.

In conventional methods for data integrity verification using a Merkel hash tree, the integrity of each block of a data object O is independently verified by the receiving client. Before receiving any data, the client first requests a certified value of H(0,1) and verifies the signature. Once it receives a block b, the client requests the authentication path of b, denoted A(b). The authentication path consists of a sequence of m hash values, one from each level. The hash value at a given level in the authentication path is the sibling of the hash value along the direct path from the hash of b upward toward the root value H(0,1). For example, the authentication path for block b(6) in FIG. 3 is A(b(6))=<H(3,5), H(2,4), H(1,1)>. These values are then used to calculate H(0,1) from the hash H(6) of block b(6) by moving up the levels of the tree, combining the computed hash at each level with the sibling authentication hash at the same level to obtain the computed hash at the next level up. For example, computed hash H(6) =H(3,6) is combined with authentication path hash H(5)=H (3,5) to obtain computed hash H(2,3) which in turn is combined with authentication path hash H(2,4) to obtain computed hash H(1,2) which finally is combined with authentication path hash H(1,1) to obtain root hash value H(0,1). If the block is corrupted or otherwise altered, then the calculated value of H(0,1) will not equal the certified value of H(0,1). Thus, the authentication path of a block and the certified hash value of the root allows the client to verify the integrity of any block. If the integrity is not verified, the client can then request the retransmission of block b. Using this method, a client does not have to download all the hash values from the entire table beforehand, nor does it need to perform expensive encryption or decryption operations. However, this solution can still lead to a high bandwidth overhead. For a data object with $2^m$ blocks, every block's authentication path will have m hash values. Assuming each hash value is 16 bytes, the overhead traffic will then be $16m*2^m$ bytes, or a fraction 16m/|b| of the data traffic, where |b| is the number of bytes per block.

In addition to the above drawbacks with authentication, current peer-to-peer security protocols also suffer from problems with other aspects of a complete security solution. For example, providing proof-of-service is important in a peer-to-peer network so that peers can demonstrate that they provided data to another peer. Proof-of-service, however, is meaningless without a reliable data integrity scheme since proof-of-service presupposes that the data delivered was not corrupted or otherwise altered. Thus, a practical proof-of-service scheme requires a practical data integrity scheme. In addition, proof-of-service has its own inherent challenges. For example, it is desirable in a peer-to-peer system to allow multiple peers to provide a receiver peer with different portions of a single file. A proof-of-service scheme in this case might require the receiver peer to send an acknowledgement to each provider peer for each block received. The providers, however, then send the acknowledgement for each block to the server, resulting in a large bandwidth overhead and demand on the server in the case of large files. There are also other challenges associated with proof-of-service, such as ensuring that provider peers cannot forge a proof-of-service, and that receiver peers can not take data without sending acknowledgements of receipt.

In view of the above, it would be an advance in the art to provide a practical and reliable peer-to-peer security protocol that overcomes some of the problems with current approaches.

SUMMARY OF THE INVENTION

In one aspect, the invention provides a method implemented at a receiver peer in a peer-to-peer file sharing network. The method includes initializing a local hash tree for a data object O using a root hash value of a hash tree for O. The root hash value is preferably digitally signed by a server, and the receiver verifies the digital signature. The receiver may also request and receive from the server a ticket authorizing the receiver to obtain the data object O. The receiver then forwards the ticket to a provider peer. The receiver sends the provider peer a request for a block of data object O and a request for a corresponding set of hash values. The corresponding set of hash values is a subset of the hash values of the hash tree for object O. The request for the set of hash values for the block simply contains the number of hash values, which is sufficient to allow the provider to determine which hash values are requested for the block. The subset preferably does not contain any hash value in the local hash tree for O and preferably includes a sequence of hash values from different consecutive levels of the hash tree. The receiver receives from the provider peer the block of O and the corresponding set of hash values of the hash tree, then verifies the integrity of the block using the received hash values and the local hash tree for O. The verification may include, for example, calculating a hash value of the block, calculating from the calculated hash value of the block and the subset of hash values a derived hash value corresponding to an existing hash value in the local hash tree, and comparing the derived hash value with the existing hash value. If the integrity of the block is verified, the receiver updates the local hash tree by adding the subset of hash values to the local hash tree, as well as any newly calculated hash values.

The method may also include sending to the provider peer an acknowledgement of receipt of the block, where the acknowledgement is digitally signed by the receiver and includes a digest of the block, a provider identifier, a receiver identifier, and an object identifier. The acknowledgement preferably includes a reference to all received blocks from the provider as well as digests of multiple recently received blocks. The receiver obtains a block key from the provider peer, uses the key to decrypt the block, and verifies its digital signature. Preferably, the block key is derived from a provider identifier, a receiver identifier, a block identifier, and a secret shared between the provider and its server.

In another aspect, a provider peer serves requested blocks of a data object to a receiver peer. The process begins when the provider receives a ticket from the receiver. The provider confirms that it has the requested object and verifies the digital signature of the ticket. The provider then sends blocks of the data object to the receiver in response to block requests from the receiver. To help the receiver peer to verify the integrity of every block received from this provider, the provider will also process every request for hash values, determine which values are requested, and provide them to the receiver peer. If the provider also wants to obtain a proof that it provided specific blocks to the receiver peer in question, for each block that it transmits, it calculates a block key, encrypts the block using the key, and transmits the encrypted block. The provider will then await an acknowledgement of receipt of the block and verify the acknowledgement before sending the receiver the block key and transmitting subsequent blocks.

In yet another aspect, a server in the peer-to-peer file sharing network digitally signs a root hash value of the data object O and sends it to one or more peers in the peer-to-peer file sharing network. The server receives from the receiver peer a request for the data object O and sends to the receiver peer the ticket authorizing the receiver to obtain the data object O. After the receiver presents the ticket to a provider and obtains the data object (or a portion thereof), the server may receive from a provider peer a copy of an acknowledgement sent from the receiver peer to the provider peer, which the provider uses as a proof of its service. The acknowledgement, also known as the proof that service was provided, is preferably digitally signed by the receiver peer and comprises a provider identifier, a receiver identifier, an object identifier, a specification of all blocks of data object O that the receiver peer received from the provider peer, and digests of most recent blocks of data object O transmitted from the provider peer to the receiver peer. The server then verifies the proof and gives credit to the provider peer if the verification is successful.

BRIEF DESCRIPTION OF THE DRAWINGS

FIG. 1A is a schematic of a conventional client-server network.

FIG. 1B is a schematic of a conventional peer-to-peer network.

FIG. 2 is a schematic of a hybrid peer-to-peer network combining features of the conventional client-server model with the pure peer-to-peer model according to an embodiment of the invention.

DETAILED DESCRIPTION

In one embodiment, the present invention provides a lightweight, scalable, robust, and flexible security protocol to support a suite of security functionalities for applications using the hybrid peer-to-peer paradigm. The security protocol can be implemented in a variety of ways, including a library of function calls, a middleware service, application-integrated features, operating system functions, etc. In a preferred embodiment, a set of security functionalities include: (1) client authentication to ensure that only authenticated clients can obtain a server's data, whether or not directly from the server, (2) data confidentiality to avoid data leakage to untrusted entities, (3) data integrity to detect data fabrication or modification with low overhead, whether the data is directly from a server or indirectly from clients, and (4) proof-of-service to allow a client to obtain a precise, non-reputable proof that it has provided specific data-sharing service to another client. More security functionalities can be added if needed. Some implementations may include just one of the above functionalities, or a combination of two or more. The protocol may have aspects implemented on clients as well as on servers. It may be deployed in a variety of different ways to improve network performance, especially in networks that deliver large files, e.g., audio and video files.

The protocol is compatible with digital rights management (DRM) techniques and allows economic and scalable delivery of large data files in a commercial context that ensures data integrity and allows for proof-of-service to enable incentives. The protocol supports two different access modes for a client to obtain its server's data: direct access and indirect access. In both modes, the client first creates a secure channel between itself and the server and then authenticates itself with the server (for instance using its account name and password or using an identity certificate). If in the direct access mode, the client will then directly receive a copy of the requested data from the server; but if in the indirect access mode, the client will obtain necessary information from the server and then turn to other peer clients to receive the data. In direct access mode the protocol is similar to known techniques such as SSL. Thus, the following description will focus on indirect access mode.

In the following description, a client who provides data to others is called a provider and a client who receives data from others is called a receiver. Clients and servers are assumed to be computing devices connected via a digital network. The devices may be fixed or portable, and they may be networked by wired or wireless networks. We interchangeably use the terms data object and file.

Figure 6A:
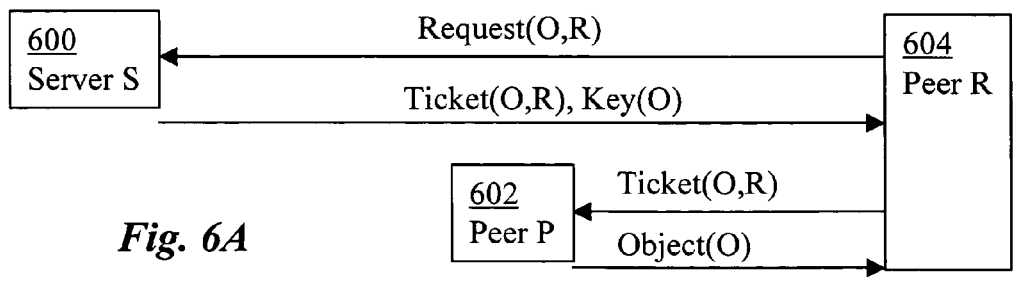
FIG. 6A is a diagram showing the transfer of information between a server, a receiver peer, and a provider peer according to an embodiment of the invention.
Figure 6B:
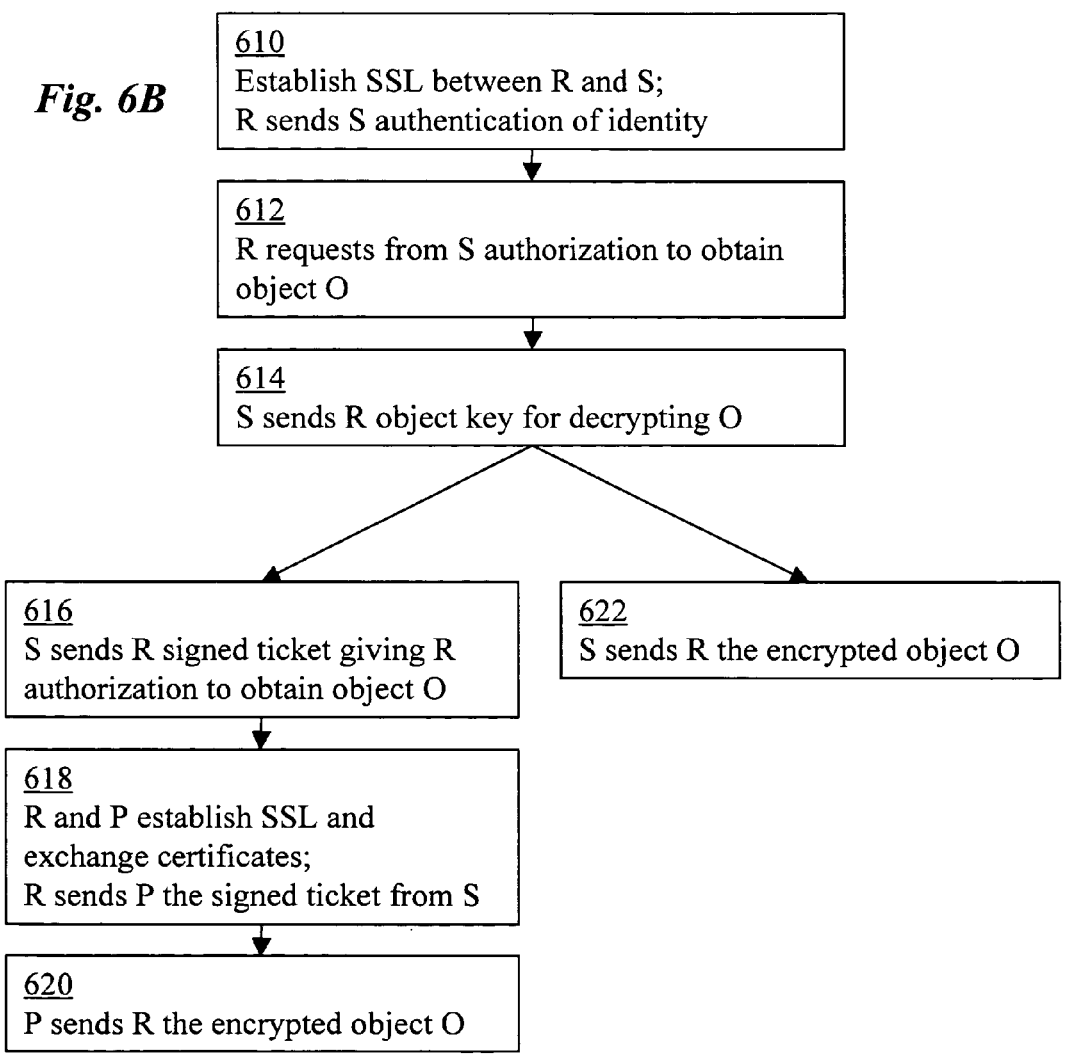
FIG. 6B is a flow chart illustrating steps of a peer-to-peer protocol according to an embodiment of the invention.

A security protocol according to one embodiment of the invention is shown in FIGS. 6A and 6B in which peers 602 and 604 share data with assistance from server 600. As shown in FIG. 6A, a receiver peer 604 that desires to obtain a data object O begins by establishing a secured connection with server 600 using a standard security technique such as SSL. Receiver 604 then sends authentication information, such as a certificate or username and password, to server 600. This step 610 is also shown in the flowchart of FIG. 6B. The peer-to-peer network initialization preferably includes an establishment of public and private key pairs by participating peers, as well as the granting of public key certificates. In one embodiment, the server managing the network acts as a certificate authority for the certificates granted to the peers. First, each peer generates a public and private key pair using a standard public key generation algorithm, then sends a certificate request to the server. The server then generates a certificate that is signed with the server's private key and sends it back to the peer. As a result, every peer has its own public key certified by the server, and every client is also able to verify the certificate of its peers.

Once peer 604 is authenticated, receiver R sends a request to server 600 in step 612. The request identifies the desired object O. The receiver R is implicitly identified by the prior authentication but may be explicitly identified in the request as well. Assuming the server decides that the client 604 is allowed to obtain the data (such as after the client paid for purchasing a file), in step 614 server 600 sends receiver 604 an object key that is required to decrypt the object O. (This step may be omitted if proof-of-service is being used, since it provides block-by-block encryption of O.) In the direct access mode, server 600 directly serves object O to receiver 604, as shown in step 622. Direct access mode may be used, for example, if no peers are willing or able to share object O with receiver 604. If one or more peers are able to share portions of object O, then server 600 issues an authorization ticket to receiver 604 in step 616. The ticket, which is digitally signed by server 600, is a verifiable proof that receiver 604 is authorized by the server to access data object O, no matter where the data object is located. The ticket typically includes a receiver identifier $ID_R$ associated with the receiver 604 requesting a data object, an object identifier $ID_O$ associated with the data object O, a time that the ticket is issued, a validity period of the ticket, and a sequence number. The server also uses its private key to sign the ticket so that any provider that knows the server's public key can verify the ticket. Server 600 may also send receiver 604 a list of one or more peers, such as peer 602, who may be able to provide some portion of object O. This list may be obtained from a directory maintained by the server containing a list of peers who have previously obtained tickets for the same object. Thus, when the server issues the ticket to a peer, the peer is added to the server directory as a peer potentially capable of providing the object to other peers.

In step 618, receiver 604 and provider 602 establish a secure connection (e.g., SSL) and exchange certificates to confirm their identities. Receiver 604 then sends provider 602 a signed copy of the ticket. Provider 602 then verifies the signatures of the ticket to verify that the ticket was sent by receiver 604 and that the ticket was issued by server 600. Assuming both signatures are verified, provider 602 sends receiver 604 the data object O in step 620. Typically, however, provider 602 sends receiver 604 only a portion of data object O, e.g., a subset of blocks of data object O. In this case, receiver 604 obtains the remaining portions of data object O from one or more other peers, or from the server 600. Since the same techniques are used to obtain data from any peer, without loss of generality, this description focuses on the protocol used to obtain any portion of data object O from one peer. Similarly, the same techniques are used to share a portion of data object O as are used to share all of data object O. Thus, without loss of generality, this description focuses on the technique used to share all of data object O, with the understanding that the same techniques apply to sharing a portion of object O.

An important part of any security protocol is data confidentiality. In a preferred embodiment, provider 602 sends an encrypted version of object O to receiver 604. The object is encrypted with a unique object-key provided to receiver 604 by server 600. Every data object can be associated with an object key for encrypting or decrypting the data object. An object key can have a life time and be replaced when it expires. Essentially an object-oriented approach, this scheme is able to enforce a fine-grained access control at the data object level. Using object keys, a server can encrypt any data object just once in advance for all potential clients, instead of once per client. Thus, provider 602 can encrypt object O itself, or provider 602 can send receiver 604 a saved copy of the encrypted version of object O that was originally received from server 600. After receiver 604 obtains encrypted object O, receiver 604 can use the object key to decrypt the encrypted object to recover the original object O. Note that the distribution of the object key from the server 600 to receiver 604 is protected by the secure connection established between them using conventional security techniques. Also note that the object key is not needed in implementations that include proof-of-service, since block-level encryption is used in proof-of-service, as will be described later.

Data Integrity

In a preferred embodiment, a technique for providing data integrity improves performance of integrity verification over prior methods. Recall that existing integrity techniques based on a hash tree require transmission of the full authentication path which contains m hash values for every block. The integrity technique of the present invention, however, reduces this overhead significantly. Instead of requesting m hash values for each block b (resulting in a total of m*N hash values for the object), a receiver in the present method requests a subset of these m hash values in the authentication path A(b), where the subset (herein called the "integrity path") is determined by the particular block b. In the case of the first block only, the integrity path is equal to the authentication path A(b). However, for subsequent blocks, the integrity path is a proper subset of the authentication path, and often significantly smaller (resulting in a total of just N hash values for the object, a bandwidth reduction by a factor of m).

Despite the fact that the integrity path does not include all the hash values from the authentication path, the receiver is nonetheless still able to compute the root hash value using cached hash values received or calculated earlier for previously received blocks. For example, if a hash value H is included in the authentication path A(b') of a prior received block b', then H can be stored in a local hash tree by the receiver. Subsequently, if the hash value H is also included in the authentication path A(b) of a later received block, then it is not necessary for the receiver to request H again. Instead, the receiver can use the value of H stored in the local hash tree. Thus, using such a local hash tree cache, all hash values in the authentication path of a block need not be transmitted for each block. Instead, a subset of the hash values is sent, i.e., the integrity path, which contains only those hash values that are not in the local hash tree cache.

Figure 3:
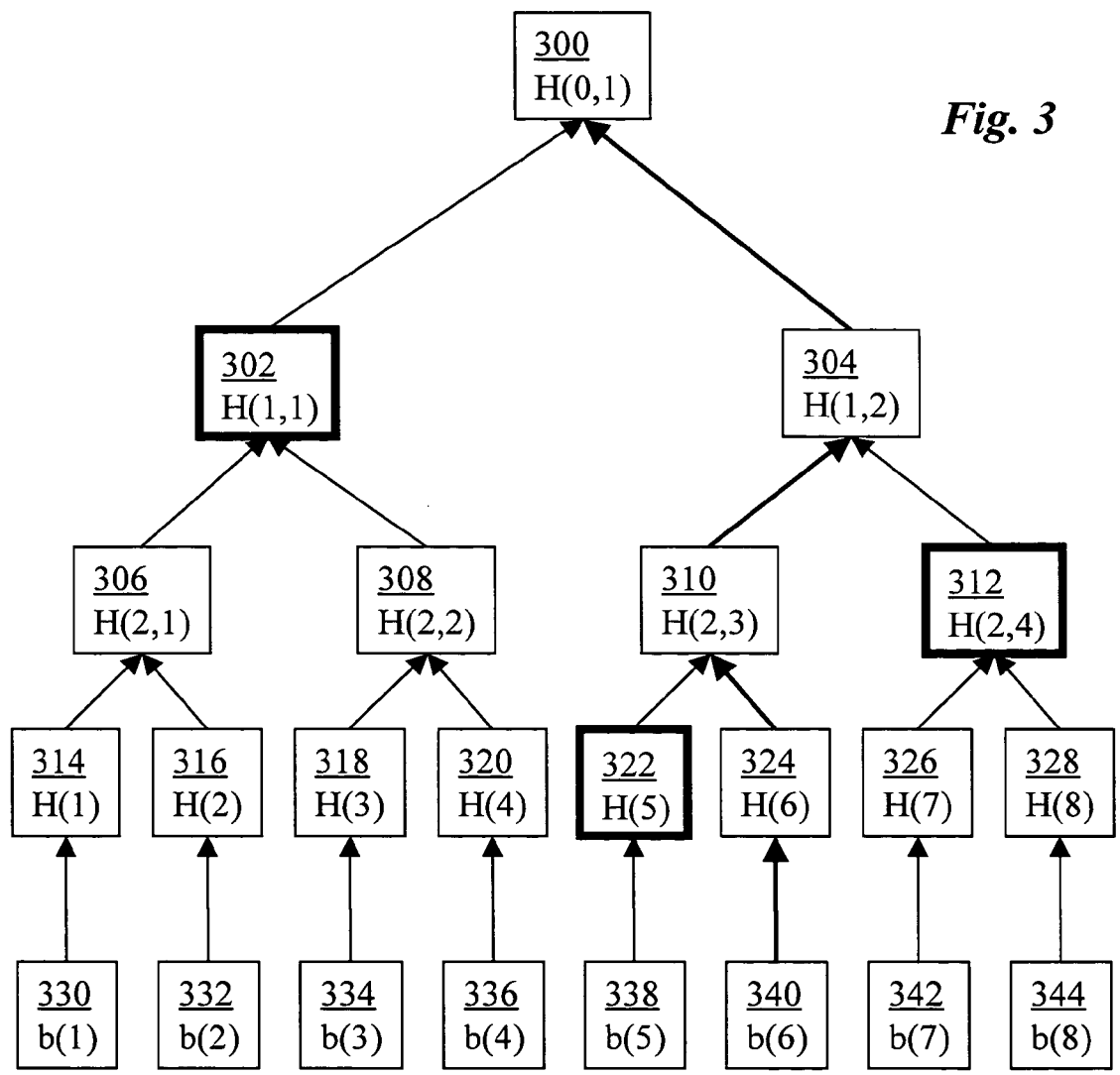
FIG. 3 is a diagram of a binary Merkle hash tree for a data object divided into eight data blocks.
Figure 4:
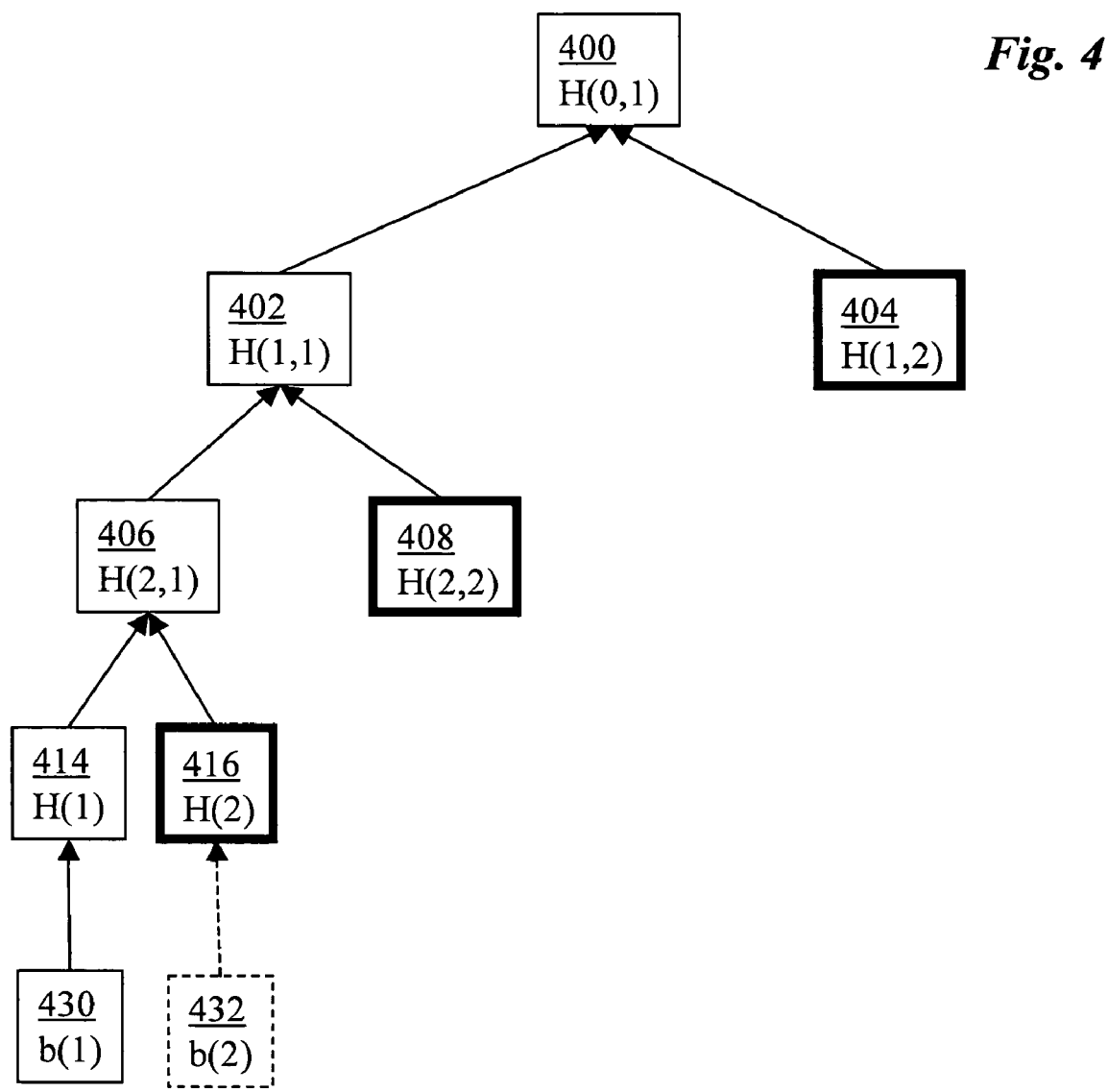
FIG. 4 is a diagram of a portion of a local hash tree showing hash values in the tree after a second block of data is received according to an embodiment of the invention.
Figure 5:
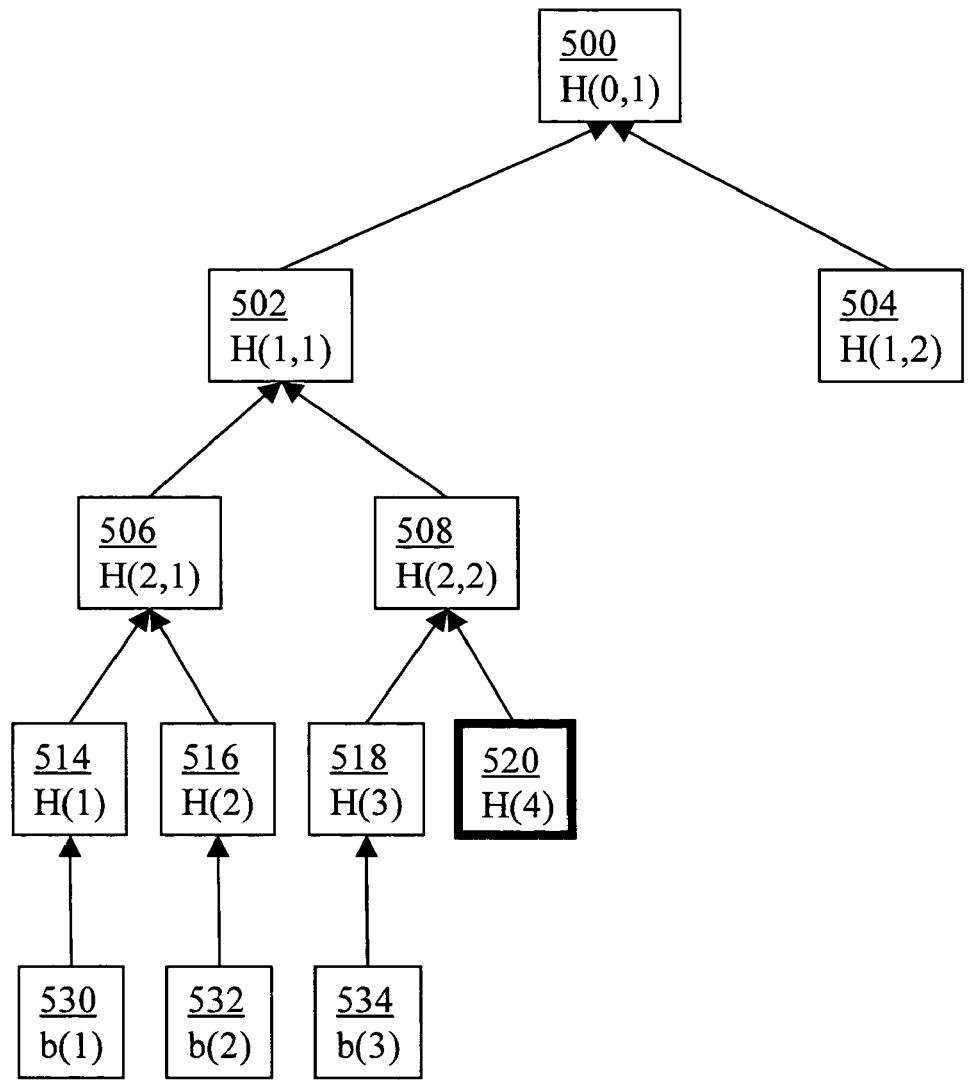
FIG. 5 is a diagram of a portion of a local hash tree showing hash values in the tree after a third block of data is received according to an embodiment of the invention.

An example of this integrity technique is illustrated in FIGS. 4 and 5. To verify first block b(1), the receiver calculates its hash value H(1) and requests from the provider or server the integrity path for b(1). The integrity path in this case includes the hashes H(2)=H(3,2), H(2,2), and H(1,2). Using these values, the receiver can calculate the root hash value H(0,1) and compare it with the verified root hash value. In particular, as shown in FIG. 4, computed hash 414 of block 430 is combined with received hash 416 to calculate hash 406 which is combined with received hash 408 to compute hash 402 which is combined with received hash 404 to obtain root hash 400. Assuming the integrity of the block is verified, the receiver then stores these hash values in a local hash tree. These cached hash values can then be used to verify the integrity of subsequent blocks. For example, to calculate the integrity of the next block b(2), no additional hash values are required since the local hash table already includes all hash values in the authentication path A(b(2)). In other words, the integrity path of block b(2) contains no hash values.

To verify the integrity of block b(2), the receiver calculates hash 416 of block 432 and compares the result with the corresponding hash value in the local hash tree. Note that hash values in the local hash tree are all verified, there is no need to repeat the computation of hash values at higher levels in the tree. Thus, not only is the bandwidth reduced from m hash values to zero, the computation is reduced from calculating m+1 hash values to calculating just one.

FIG. 5 illustrates the verification of block b(3). In this case, the integrity path includes just one hash value, H(4), and the verification of block b(3) involves calculating the hash H(3) of block b(3) then combining this result with the received hash value H(4) to obtain calculated hash H(2,2). Since a verified value of H(2,2) is already present in the local hash tree, comparing this verified value with the hash calculated from b(3) is sufficient to verify the integrity of b(3). More specifically, to verify the integrity of received block 534, the receiver calculates hash 518 and combines it with received hash 520 to obtain a computed hash which will be equal to verified hash 508 stored in local hash tree. The local hash tree in this case includes stored hash values 500, 502, 504, 506, 508, 514, and 516 obtained or calculated when verifying previous blocks 530 and 532. In addition, if block 534 is verified, the local hash tree is updated to contain newly calculated hash value 518 and newly obtained hash value 520 used for verifying block 534. Thus, in this case, the integrity path includes just one hash value and the verification requires the computation of just two hashes.

In general, the integrity path of a block b contains those hash values from authentication path A(b) that are not already stored in the local hash tree. It is not immediately obvious, however, exactly which hash values are contained in the integrity path of any given block. It can be demonstrated, however, that the integrity path for a given block can be determined as follows. Consider the block's authentication path A(b) which contains m hash values, one from each level of the tree. If all m hash values are already contained in the local hash tree, then the integrity path IP(b) for b is empty. If the hash at level j−1 is contained in the local hash tree, but the hash at level j is not, then the integrity path IP(b) includes the hashes from levels j through m of A(b). The number of hash values in IP(b) is denoted |IP(b)| and is equal to m−j+1 when j<m and 0 when j=m. Note that after correctly receiving a block (not necessarily the first block of the file), the size of |IP(b)| is less than m for all subsequent blocks.

In practice, when a client receives block b from a server or a provider, if |IP(b)| is not zero, then it sends a request for IP(b) to the server or the provider. The request, for example, may include a sequence number for block b together with the number |IP(b)|. The server or provider then responds with the sequence of |IP(b)| hash values from A(b) that start from level m and go up the tree. In some cases, however, it may not be necessary for the receiver to send an explicit request for IP(b). For example, if the receiver has sent to the provider an acknowledgement of an immediately previous block, the provider can infer the integrity path of the current block and send it automatically with the block data. The receiver then uses the hash values in IP(b) and the hash values in the local hash tree to verify the integrity of block b. Assuming the block b is verified, the hash values in IP(b) and any newly calculated hash values are stored in the local hash tree. The updated hash tree therefore contains only verified hash values. It is initialized with the certified root hash value and for each block the local hash tree is updated with new hash values only when the block integrity is verified. Note that, since the local hash tree contains verified hash values, only |IP(b)|+1 hash values need to be computed in order to verify the integrity of block b.

Proof-of-Service

In commercial implementations of peer-to-peer networks, it is valuable to provide mechanisms for proof-of-service so that peers can be given incentives to share data and thereby reduce the demands on the server. Preferably, these incentives include one or more of the following: granting of credits to a peer that provides data to another peer, and granting credits to a peer that obtains data from other peers rather than the server. The credits may include discounts, credits toward future purchases, cash rewards, coupons, or other valuable consideration. A valuable proof-of-service technique should allow a peer to obtain a proof that can be verified by the server of its service to another peer. This requires that the data integrity is not compromised, that the provider is not given credit for a service that was not provided, and that a receiver acknowledges any service received. A practical proof-of-service technique should also be scalable and not require excessive bandwidth or storage.

In a preferred embodiment of a proof-of-service technique, an interlocking block-by-block verification mechanism is used between provider and receiver. For each block b that a provider sends to a receiver, the receiver sends to the provider a non-reputable acknowledgment Ack b that is signed by the receiver. The provider verifies the acknowledgment (e.g., using the public key of the receiver) before providing the next block. The provider can then present the verified acknowledgments to the server as proof that the provider has given service to the clients.

To ensure that the receiver cannot use a received block without sending an acknowledgement to the provider, the provider first encrypts the block using a block key and sends the encrypted block to the receiver. The provider only sends the block key to the receiver after receiving and verifying a block acknowledgement from the receiver. Preferably, the block key itself is protected by encrypting it using R's public key so that only R can decrypt and use the block key. The provider preferably signs the block key together with a block identifier $ID_b$, provider identifier $ID_P$, and receiver identifier $ID_R$, so that the receiver can verify that the block key originated from the provider and correctly associate the block key with the correct block. The block key is then decrypted by the receiver and used to decrypt the block. In a preferred embodiment, the block key is calculated by the provider using a one-way hash function, g. The block key for block b sent from provider P to receiver R may be written $g(ID_P, ID_R, ID_b, k)$, where k is a secret key shared between the provider and the server. Note that the server can independently use g to calculate the block key. Thus, in the event that the receiver does not receive the block key from the provider, the receiver can request the block key from the server, e.g., by sending its signed block acknowledgement to the server. A receiver may decide not to request additional blocks from such a provider.

To ensure that the provider does not receive credit for delivering a corrupted block, the acknowledgement sent by the receiver to the provider is constructed to depend on a hash of the encrypted block data. Thus, when the provider presents the acknowledgement to the server, the server can determine whether or not the block data received by the receiver was corrupted. In particular, the receiver can use a one-way hash function d to calculate a digest of the encrypted block. This digest can then be combined with the provider identifier $ID_P$, receiver identifier $ID_R$, and object identifier $ID_O$ to form a single data object that the receiver signs with its private key to form the acknowledgement. Using the receiver's public key, the acknowledgement can be verified as originating from the receiver. In particular, the provider can verify the signature and also verify that the digest of the encrypted block is correct, confirming that the receiver correctly received the encrypted block without corruption. The provider can then present the acknowledgement to the server, and the server can similarly verify that the receiver correctly received the encrypted block from the provider. The acknowledgement may also include additional data such as a timestamp that records when the acknowledgement was issued by the receiver and a SACK field that contains a reference to multiple received blocks. The SACK field thus allows multiple blocks to be simultaneously acknowledged, e.g., using a format similar to the SACK field used by TCP.

The use of a SACK field to allow cumulative acknowledgement eliminates the need for the provider to send acknowledgements for every block to the server and for the server to separately verify the acknowledgement for every block. Instead, the provider can present just one acknowledgement, or just a few acknowledgements, for all the blocks acknowledged by the receiver. This dramatically reduces the bandwidth requirements between provider and server as well as the computational load on the server.

Figure 7A:
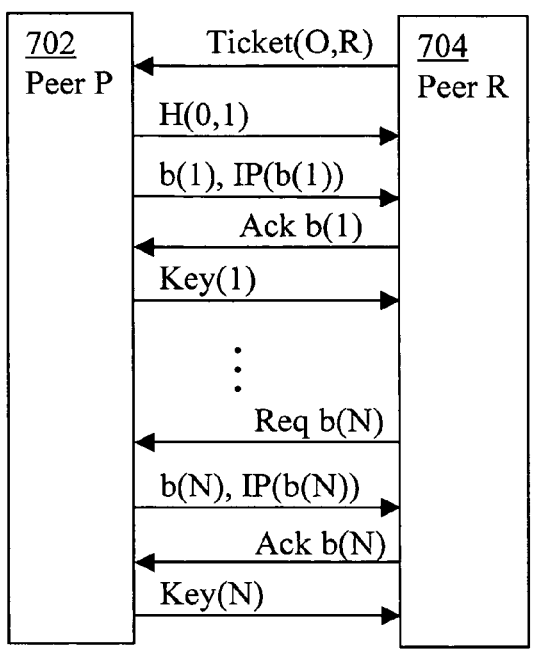
FIG. 7A is a diagram showing the transfer of information between a receiver peer and a provider peer according to an embodiment of the invention.
Figure 7B:
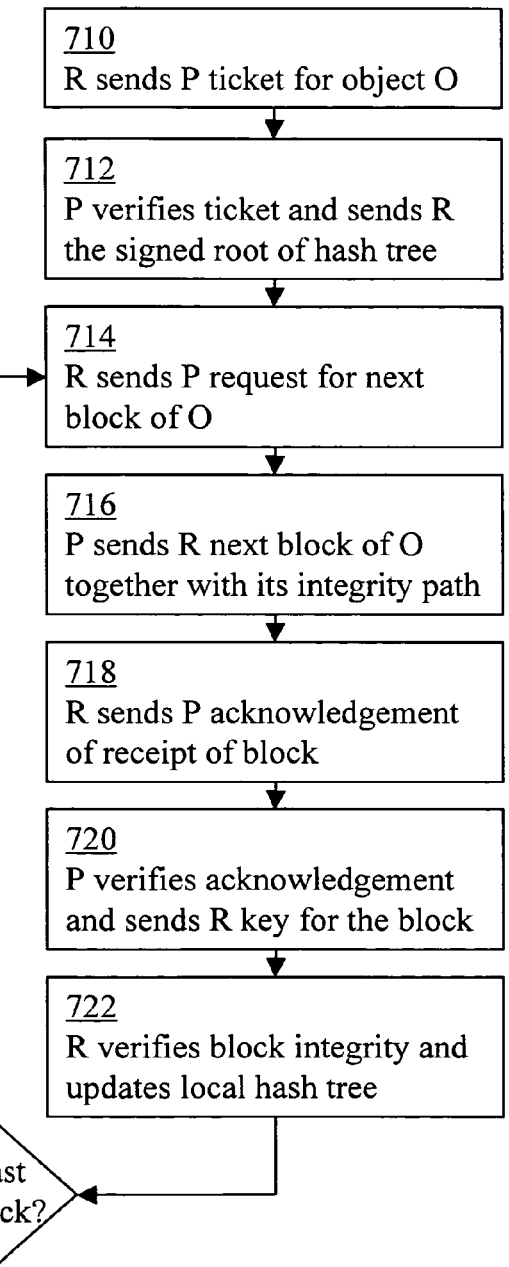
FIG. 7B is a flow chart illustrating steps of a peer-to-peer protocol according to an embodiment of the invention.

FIGS. 7A and 7B illustrate a technique for providing data integrity and proof of service according to a preferred embodiment of the invention. In step 710, receiver 704 sends provider 702 a copy of the signed ticket authorizing the receiver to obtain data object O. The provider verifies the ticket in step 712 using the public key of the server. Assuming the ticket is verified, provider 702 sends receiver 704 a signed root hash value $H(0,1)$ for the data object O. Receiver 704 then verifies the root hash value and initializes its local hash tree for the data object O. Receiver 704 also initializes a block sequence number to a block of object O, e.g., the first block or a later block if previous blocks have previously been obtained.

In step 714, receiver 704 sends provider 702 a request for a block of data object O. The request may include, for example, the object identifier $ID_O$, a block sequence number i corresponding to the requested block, and the integrity path request. In step 716, provider 702 responds by encrypting block b(i) with a corresponding block key and sending the encrypted block to receiver 704. Provider 702 also sends the integrity path hash values requested for the block.

In step 718, receiver 704 constructs an acknowledgement of receipt for the encrypted block, signs it, and sends it to provider 702. In step 720, provider 702 verifies the signature of the acknowledgement and also checks the digest in the acknowledgement to verify that the block was not corrupted. If verified, provider 702 sends the encrypted block key to receiver 704. In step 722, receiver 704 decrypts the block key and uses it to decrypt the encrypted block. The receiver then calculates the hash value for the block and uses it, together with the local hash tree and the received integrity path hash values for the block, to verify the integrity of the block. If the block integrity is verified, receiver 704 then updates the local hash tree with new hash values. If the block integrity is not verified, receiver 704 may elect not to request any more blocks from provider 702 and may request blocks from other peers or from the server. If the last block of object O has been received, or receiver 704 does not desire any more blocks from provider 702, then the session is terminated. Otherwise, the receiver increments the block sequence number and repeats steps 714 through 722 for another block.

After provider 702 has shared all or part of data object O, provider 702 can then forward to the server one or more acknowledgements from receiver 704. The server can then verify the acknowledgement to confirm that receiver 704 obtained a particular set of blocks of data object from provider 702, and that the last block was not corrupted. (Prior blocks are assumed to be uncorrupted since the receiver continued requesting subsequent blocks from the provider.) The server can then credit provider appropriately for sharing the blocks. If the server's verification of the acknowledgement fails, then the provider is not given credit for sharing the blocks. In an alternate embodiment, the acknowledgement sent from the receiver includes digests of several prior blocks in addition to the digest of the most recent block it received from the provider. The server can then verify the integrity of multiple recently shared blocks, and not just the integrity of the most recent block. The advantage of including multiple digests in the acknowledgement is that receiver 704 need not wait for the block key, decrypt the block, and verify the block integrity before requesting and sending an acknowledgement for a subsequent block. The steps 720 and 722 of FIG. 7B, in other words, can be performed in parallel for one block while the loop continues to steps 714, 716, and 718 for the next block. The number of prior block digests included in the acknowledgement for a given block is preferably greater than or equal to the number of subsequent blocks that the receiver acknowledges before the integrity of the block is verified. Otherwise, the receiver risks sending an acknowledgement that does not contain a digest of an acknowledged block that is corrupted, giving the provider an incorrect proof of service. In this embodiment, the server verifies all the digests included in the acknowledgement before giving credit to the provider. The number of digests included in the acknowledgement is selected such that it is small enough to be scalable, but large enough to maintain a high level of parallelism. In any case, as with the other embodiments of proof-of-service, a provider can wait until the end of serving a receiver to present a single proof of its service toward the receiver. Thus, the demand on the server by providers is small. In addition, there is also a small load on the server from receivers, e.g., from requests to verify or retrieve the block key of a block it receives from a provider, which happens rarely since normally the receiver will obtain the correct block key from the provider.

The security features discussed above (i.e., authentication, confidentiality, integrity, and proof-of-service) can be implemented in a variety of combinations. In some applications of peer-to-peer networks, authentication alone is sufficient, e.g., in cases where file access is restricted to peers who have been granted permission by the server and these peers are enclosed in a protected environment such as a secure subnet. Other applications will find it useful to implement authentication in combination with confidentiality, e.g., when it is necessary to counter the eavesdropping threat in an open environment. In other applications, it may be useful to implement data integrity alone, e.g., in the case of a network used to freely distribute large public files whose integrity must be assured. Integrity may also be implemented in combination with authentication, e.g. when the server also needs to log who accessed a file. Integrity may be implemented in combination with both authentication and confidentiality when file access is restricted to certain peers and they must secretly obtain files with full data integrity, e.g., when the video of enemy movement in a battle needs to be accurately and secretly distributed to all soldiers but nobody else. Integrity may also be implemented in combination with authentication and proof-of-service, e.g., when a small entertainment business is selling a large volume of audio and/or video files to its customers and it wants to encourage and credit those customers who help distribute the files in order to reduce the server's bandwidth expenses. Note that, since proof-of-service already contains its own block-level encryption, additional confidentiality functionality is not necessary in applications that use proof-of-service. Most commercial applications likely will implement the integrity, authentication, and proof-of-service security features together because of the advantages that the combination provides.

The techniques of the present invention are secure against attempts by individual peers to circumvent authenticity, confidentiality, data integrity, and proof-of-service. Authenticity and confidentiality are ensured by the use of conventional cryptographic techniques. Integrity of an object is guaranteed by the certified root value of the hash tree which any user can verify. If any block of the object is modified, the integrity verification process for the block will fail. An individual receiver cannot circumvent proof-of-service because only after the provider receives and verifies an acknowledgement from the receiver does the provider send the receiver the block key needed to decrypt the block (preventing the receiver from sending an invalid acknowledgement or no acknowledgement at all). An individual provider cannot circumvent the proof-of-service scheme because valid acknowledgements are signed by the receiver using the receiver's private key (preventing the provider from constructing a forged acknowledgement), because valid acknowledgements contain digests of the delivered blocks (preventing the provider from sending corrupt or incomplete data), because the server can provide the receiver with block keys (preventing the provider from withholding a block key) and because every acknowledgement contains a receiver-specific signature and the IDs of both the actual provider and receiver involved (preventing a provider from getting credit for service to itself, for service actually provided by another provider, or for service actually provided to another receiver).

In principle, since the server does not directly monitor data transmission between peers, multiple peers could collude to forge proofs of service when no data transmission occurred. For example, a peer who already has a file could construct a false acknowledgement allegedly acknowledging receipt of the file by an accomplice and then get the accomplice to sign it. If no accomplice is available or agreeable, the peer could potentially create multiple identities and thus create virtual accomplices. Peers could also collude by sharing private keys, which would allow peers to sign false acknowledgements from each other. To address this form of collusion, the following economical countermeasure can be used: when the server receives a proof of service from a provider to a receiver, before crediting the provider, the server will make sure it charges the receiver for the service. In addition, the server can limit the number of credits it grants for a given block delivered to a given receiver. For example, the server could grant no more than three credits for serving a block to a receiver. This allows some legitimate service redundancy while limiting the potential for abuse.

Implementations of the invention may use any of various types of computers, operating systems, storage devices, network connections, and underlying networking protocols. Implementations of the invention may also employ various standard cryptographic and security techniques known in the art. For example, implementations may use 3DES (112-bit key length) or AES for classical cryptography, RSA (1024-bit key length) for public key cryptography, and MD5 or SHA-1 for hashing algorithms.

The invention claimed is:

1. A method implemented at a receiver peer device in a peer-to-peer network comprising the receiver peer device, a server, and multiple provider peer devices, the method comprising:
    a) sending by the receiver peer device to the server a request for an authorization to obtain a data object O, wherein the request identifies the data object O;
    b) receiving by the receiver peer device from the server in response to the request a ticket comprising an authorization by the server for the receiver peer device to obtain the data object O from any one of the multiple provider peer devices,
        wherein the ticket is digitally signed by the server and comprises a receiver identifier associated with the receiver peer device and an object identifier associated with the data object O;
    c) sending by the receiver peer device the ticket to a provider peer device, whereby the provider peer device may verify that the receiver is authorized to receive the data object O;
    d) sending by the receiver peer device to the provider peer device a request for a block of the data object O,
        wherein the request comprises a block sequence number corresponding to the block,
        wherein the requested block is a portion of the data object O not yet received by the receiver peer from any of the multiple provider peer devices;
    e) receiving by the receiver peer device from the provider peer device the block of the data object O, wherein the block is encrypted by the provider peer device using a block key uniquely associated with the block;
    f) sending by the receiver peer device to the provider peer device an acknowledgement of receipt of the block, wherein the acknowledgement is digitally signed by the receiver peer device and comprises a digest of the block and a provider identifier;
    g) receiving by the receiver peer device from the provider peer device, in response to the acknowledgement, the block key used by the provider peer device to encrypt the block, wherein the block key is digitally signed by the provider peer device to produce a digital signature of the block key;
    h) verifying by the receiver peer device the digital signature of the block key, whereby the receiver peer device may verify that the block key originated from the provider peer device;
    i) a decrypting by the receiver peer device the block using the block key received from the provider peer device; and
    j) verifying by the receiver peer device an integrity of the block of the data object O, and recording by the receiver peer device that the block was received.

2. The method of claim 1 wherein the acknowledgement further comprises a receiver identifier, and an object identifier.

3. The method of claim 1 wherein the acknowledgement further comprises a reference to multiple received blocks.

4. The method of claim 1 wherein the acknowledgement further comprises digests of multiple received blocks.

5. A method implemented at a provider peer device in a peer-to-peer network comprising a receiver peer device and multiple provider peer devices, wherein the multiple provider peer devices comprise the provider peer device, the method comprising:
    a) receiving by the provider peer device from a receiver peer device a ticket comprising an authorization by the server for the receiver peer device to obtain a data object O from any one of the multiple provider peer devices;
        wherein the ticket is digitally signed by the server and comprises a receiver identifier associated with the receiver peer device and an object identifier associated with the data object O;
    b) verifying by the provider peer device a digital signature of the ticket, whereby the provider peer device may verify that the ticket originated from the server;
    c) receiving by the provider peer device from the receiver peer device a request for a block of the data object O,
        wherein the request comprises a block sequence number corresponding to the block;
    d) sending by the provider peer device to the receiver peer device the block of the data object O, wherein the block is encrypted by the provider peer device using a block key uniquely associated with the block;
    e) receiving by the provider peer device from the receiver peer device an acknowledgement of receipt of the block, wherein the acknowledgement is digitally signed by the receiver peer device to produce a digital signature, wherein the acknowledgement comprises a digest of the block and a provider identifier;

f) verifying by the provider peer device the digital signature, whereby the provider peer device may verify that the acknowledgement originated from the receiver peer device;

g) verifying by the provider peer device the digest, whereby the provider peer may verify that the block of the data object O was correctly received by the receiver peer device;

h) sending by the provider peer device to the receiver peer device, in response to the acknowledgement, the block key, wherein the block key is digitally signed by the provider peer device; and i) sending by the provider peer device to a server the acknowledgement, whereby the server may give credit to the provider peer device for providing the block to the receiver peer device.

6. The method of claim 5 wherein the acknowledgement further comprises a receiver identifier, and an object identifier.

7. The method of claim 5 wherein the acknowledgement further comprises a reference to multiple received blocks.

8. The method of claim 5 wherein the acknowledgement further comprises digests of multiple received blocks.

9. A method implemented at a server in a peer-to-peer network comprising the server, a receiver peer device, and multiple provider peer devices comprising a provider peer device, the method comprising:

a) receiving by the server from the receiver peer device a request for authorization to obtain a data object O;

b) generating by the server a ticket authorizing the receiver peer device to obtain the data object O from any one of the multiple provider peer devices, wherein the ticket comprises a receiver identifier associated with the receiver peer device and an object identifier associated with the data object O, c) digitally signing by the server the ticket;

d) sending by the server the ticket to the receiver peer device, whereby the receiver peer device may use the ticket to obtain the data object O from the provider peer device by providing the ticket to the provider peer device;

e) if the server receives a request from the receiver peer device for a block key for a block of the data object O, calculating by the server the block key and sending by the server the block key to the receiver peer device;

f) receiving by the server from the provider peer device a copy of an acknowledgement sent from the receiver peer device to the provider peer device acknowledging receipt by the receiver peer device of a portion of the data object O transmitted by the provider peer device, wherein the acknowledgement is digitally signed by the receiver peer device to produce a digital signature of the acknowledgement, wherein the acknowledgement comprises a provider identifier and a digest of at least one block of the data object O that was transmitted from the provider peer device to the receiver peer device;

g) verifying by the server the digital signature of the acknowledgement, whereby the server may verify that the acknowledgement originated from the receiver, h) verifying by the server the digest, whereby the server may verify that the at least one block of the data object O was correctly received by the receiver peer device;

i) giving by the server credit to the provider peer device using the acknowledgement as proof-of-service if the digital signature of the acknowledgement is verified and the digest contained in the acknowledgement is verified.

10. The method of claim 9 further comprising: receiving by the server from the receiver peer device a request for a block key corresponding to a block of the data object O sent from the provider peer device to the receiver peer device; calculating by the server the block key based upon a provider identifier, a receiver identifier, a block identifier, and a secret shared between the provider peer device and the server; and sending by the server to the receiver peer device the block key.

11. The method of claim 9 wherein the acknowledgement further comprises a receiver identifier and an object identifier.

12. The method of claim 9 wherein the acknowledgement comprises multiple digests.

13. The method of claim 9 wherein the acknowledgement further comprises a reference to multiple received blocks.

* * * * *